Dec. 11, 1928.

S. W. RUSHMORE 1,694,397

ENGINE COOLING SYSTEM

Filed Aug. 10, 1926   3 Sheets-Sheet 1

INVENTOR
Samuel W. Rushmore
BY
George C. Ahran
his ATTORNEY

Dec. 11, 1928. 1,694,397

S. W. RUSHMORE

ENGINE COOLING SYSTEM

Filed Aug. 10, 1926   3 Sheets-Sheet 2

INVENTOR
Samuel W. Rushmore
BY
his ATTORNEY

Dec. 11, 1928.

S. W. RUSHMORE

ENGINE COOLING SYSTEM

Filed Aug. 10, 1926

INVENTOR
Samuel W. Rushmore
BY
ATTORNEY

Patented Dec. 11, 1928.

1,694,397

UNITED STATES PATENT OFFICE.

SAMUEL W. RUSHMORE, OF PLAINFIELD, NEW JERSEY.

ENGINE-COOLING SYSTEM.

Application filed August 10, 1926. Serial No. 128,345.

My present invention relates more particularly to cooling systems of the type commonly employed on automobiles or the like, but in which the heat transfer is mainly by boiling or superheating water to absorb surplus heat of the engine and condensing the resultant steam to dissipate said heat in the radiator. The problems are therefore generically similar to those set forth in certain of my prior patents, particularly No. 1,378,724, granted May 17, 1921. There is further similarity in that the apparatus preferably embodies a force feed water circulating system of small heat radiating capacity serially including a water jacket, a water outlet pipe from said jacket, and a water container to which said pipe is connected, in combination with large capacity radiating means above the water container, and preferably also a low resistance outlet for escape to the outer air for steam, air or water.

On the other hand, my present arrangement is primarily intended to avoid the specific features of said patent which include having only part of the lower chamber of the radiator filled with water; having the honeycomb or core operate mainly as an upflow condenser in which all of the cooling passages have steam flowing upward and condensate flowing downward in the same passage; and having the upper chamber operate mainly as a header for escape of air from all the passages.

In both arrangements the functioning is complicated because of the wide variations in the character of the discharge from the water jacket, due to wide variations in heat evolution and in cooling capacity attendant upon varying loads and speeds of motor, fan or car, disrepair of the apparatus and changes of climate, weather or altitude, etc. When, for any of these reasons, my prior apparatus is overtaxed, it is because the steam blows through some of the less well cooled passages of the core before the better cooled passages are fully loaded, but, as the lower chamber is only partly filled with water and all of the water is at or near boiling temperature, such effects are not important except as somewhat limiting the maximum load that the condenser will take care of without loss of steam, and even this limitation may be removed and the entire radiator surface made available for progressive invasion of the upflowing steam, by the use of selectively acting flow-resistances, as broadly claimed in my prior Patent, Reissue No. 16,382, granted July 13, 1926.

In my present specifically different arrangement, I retain the generic features set forth in said Patent No. 1,378,724, but I have discovered that it is possible to utilize them with other means whereby the maximum cooling capacity of the entire radiator surface will be available for cooling, without any necessity for the above described selectively acting flow resistances. This requires recognition that the original difficulty in my prior apparatus resulted because the upflow of the steam was in accordance with the laws of flow of elastic gases, namely, steam and air; that in lieu of controlling operations in accordance with said laws, it is possible to dominate the steam flow by establishing and maintaining thermo-siphon circulation of water in the radiator in such a way that the steam can only accelerate it, without interfering with it. The first essential is continuously maintaining a body of water submerging the honeycomb and most of the upper chamber during normal operation of the apparatus. Then the steam flow can be domiated by the other more easily controllable kinds of selective flow tendencies that are characteristic of liquids. The further features of my invention relate mainly to controlling the latter in commercially practicable ways. Coordinating all the essential requirements has required solution of several more or less interdependent practical problems.

In normal operation of my present apparatus, I prefer to circulate much more water than is necessary in my prior apparatus, and the discharge into the base of the radiator is not merely steam but rather a mixture comprising steam and water which is more or less superheated, and therefore evolves steam progressively as the pressure is relieved in its passage to the condenser. The part of the water that goes to steam has its volume thereby increased some seventeen hundred times and a characteristic result is a blast mixture of steam propelling several times its weight of steaming water. In practice the water is persistently foamy and frothy at times, and checking the velocity of the mixture develops important momentum effects.

The tubes are characteristically long and thin. A straight cylindrical tube, say, 20 inches high by one-quarter inch diameter will have a flow section of only about one-twentieth of a square inch, so that its total cubic content is about 1 cubic inch. Consequently, if as much as one-quarter of a cubic inch of steam is given opportunity to enter the tube as a single body, without being subdivided into further bubbles by surface tension plus depth pressure, it will fill about 5 inches of the tube; one-half cubic inch will fill 10 inches of the tube, etc. Under ordinary conditions the steam will flow to some of the tubes in such volumes as to fill considerable lengths thereof and even if the steam condenses, instead of flowing through, the final stage is a sudden collapse of the steam and the resulting inrush of water produces such loud noises in the tubes that the apparatus is wholly uncommercial.

Another point is that with the radiator full of water, the entire surface areas of all of the honeycomb and upper chamber are continuously operative for effectively radiating heat, instead of coming into operation progressively from the bottom up, in proportion as the steam evolution increases, and these areas being sufficient for cooling under conditions of maximum heat evolution, it follows that normally the downflow into the lower chamber will be relatively cold. Consequently, merely short-circuiting the pump circulation through the lower chamber of the radiator is not sufficient to ensure the desired prompt boiling in the water jacket. Either the pump supply must be greatly restricted or else the intake must be shortcircuited rather closely to the hot part of the discharge from the engine jacket, yet in such a way that under conditions of maximum steam discharge it will not suck in steam nor interfere with proper disposition thereof.

Another point is that when heat is liberated in the base of a full radiator, it naturally sets up a thermo-siphon circulation, the warmer and therefore lighter water flowing upward in some of the tubes while the colder, heavier water naturally flows downward into the lower chamber from other tubes as fast as it becomes chilled in the honeycomb, and the rate of the circulation tends to increase automatically with increase in the rate of heat dissipation which, of course, tends to increase with the temperature differential. When the radiator is fan-cooled, this circulation is naturally upward through the less well cooled tubes at the sides, but my invention contemplates arranging matters so that the circulation, while remaining orderly and increasing with the temperature as before may be upward in the central best cooled tubes and downward in those nearer the sides.

The specific means which I have devised for overcoming these various difficulties includes a considerable number of specific contributing features, the relative importance of which it is not easy to define. The principal points seem to be distributing and diffusing instead of localizing the discharge in the lower chamber of the radiator; also minimizing or eliminating the endwise velocity of said discharge, thereby permitting thermo-siphon circulation in the core to work itself out in accordance with the above described hydrostatic unbalance of hot, light, upflowing fluid in some tubes, preferably the central tubes, as against colder, heavier downflowing water in other tubes; and to do so practically undisturbed by endwise velocity-momentum effects even under conditions of maximum discharge of the steam-water mixture.

Consequently, I prefer to have the fluid mixture from the water jacket discharge, subdivided and distributed through a multiplicity of small outlets sufficient to ensure low velocities; to have the direction of even this low velocity discharge transverse instead of lengthwise of the lower chamber, preferably radially thereof and preferably distributed from the surface of a relatively long conduit disposed lengthwise in the lower chamber; preferably extending beneath approximately one-fourth to two-thirds of the core or honeycomb so as to establish conditions favorable for thermo-siphon operation with the upflow definitely established in the tubes directly above the discharge surface and the down circulation in the other tubes. In ordinary radiators, the permissible circumference for a cylindrical discharge device is limited to about 6 inches, but the entire surface may be utilized as outlet area. The resulting low velocity or diffused discharge is preferably distributed directly below the central tubes that are best cooled by the fan. With such arrangement, steam evolution sufficient to cause large volume flow of steam upward in the honeycomb tubes will not result in noisy tubes or loss of steam in the upper chamber, even under trying conditions.

While the length of the discharge device may be within the limits above described, I have discovered that for all lengths, it is desirable to have substantial flow resistance for the outlets and to have it more or less proportioned to the total outlet area, thereby tending to equalize the outward pressure on all of the outlets, otherwise outside cold water may be drawn into some of them by injector action.

While various means may be employed for ensuring diffused, low velocity discharge of the steam into the body of water in the lower chamber of the radiator, my preferred discharge device operates as a condenser of substantial internal condensing capacity, so that much, and, under some conditions, all of the hot fluid will flow into the body of water in the lower chamber, in the form of small volume, low velocity condensate, instead of steam. Moreover, the preferred device is designed to operate efficiently as a separator in which the water, froth and steam are free to follow the same paths, the separation being caused partly by gravity and partly by strainer effects due to differences in momentum and to unlike flow-resistances developed by steam, foam and water.

These results may be accomplished through a simple device consisting of a perforated pipe, the outside of which, for a distance beyond the perforations in both directions, is covered to a considerable depth by closely set filaments or strands of metal wire or the like, preferably woven wire netting which, in the case of mosquito netting, may be a spiral of, say, 30 layers affording a surface 6 inches in circumference. In such case, the pipe will be an inch or less in diameter. Between the netting and the pipe are spacers which may be in the form of an open-wound spiral of heavy wire providing a cylindrical open space for free distribution of the steam, froth and water over the entire interior cylinder of the netting. This netting being wound to a depth of say, half an inch, and being of good conducting material, affords a heat transfer medium highly favorable to breaking up foam, separating steam from water, condensing steam, permitting lateral escape of uncondensed steam and upflow thereof with hot water surrounding it.

All or most of the perforations are preferably located on the under side of the pipe so that the discharge is primarily downward. This affords long upward paths for passage of the ascending current of the various fluids through the mesh or labyrinth formed by the netting. In order to further equalize the outflow, the number or spacing or size of the perforations is preferably decreased toward the far end of the pipe, this being where the checked momentum of the mixture tends to pile up the pressure.

While the steam is forced upward by the depth pressure of the outside water, the hot water is discharged from the perforations with such velocity that most of it passes down through the gauze and much of it is sucked into the pump intake. The pump requires more water than is thus discharged, but some water drawn down by the high velocity jets has been heated by the escaping steam, so there is a sufficient layer of comparatively hot water at the bottom of the tank under the discharge device from which the pump can draw its supply. It is not essential that the pump supply be heated to fully 212°, as is the case with the "dry" cooling system. In practice the feed may run from about 180° when idling to 215° when on full load and when these is necessarily some slight pressure in the bottom tank.

For any given engine and cooling system, the speed of circulation varies with the number and flow capacity of the upflow tubes as compared with the downflow. The fewer tubes the steam is forced through, the more likely it is to blow through the top. To utilize the maximum cooling capacity of the average automobile radiator, I prefer to distribute the discharge so that the central two-thirds or more of the radiator passages will be upflow and, under maximum conditions of load and hot water, each will carry large amounts of the steam. Under certain conditions, the discharge device may almost cease to be a condenser and the steam in relatively small bubbles will flow upward from the netting into the radiator passages much faster than the surrounding hot water, but with proper length and flow resistance for the discharge device relative to the number, diameters and heights of the cooling passages, the amount of steam forced into any one tube by the depth pressure and thermal circulation, will not be greater than that tube can condense within the time permitted by the speed of circulation. In such case, the amount and subdivision of the steam entering any one tube can be sufficiently controlled and limited by friction of the water in the tubes together with the retardation that results from the intermittent cut-off or bubble forming tendency which the water has by reason of the depth pressure and the surface tension of the water contacting with the steam.

The surrounding hot water will protect the steam from contact with the relatively cold water from the downflow tubes, thus preventing the excessive noise that results from sudden condensation when steam contacts with water that is too cold. The heating up being gradual, no uncondensed steam issues from the discharge device until the thermal circulating system is in condition to take care of it.

The above and other features of my invention may be more fully understood from the following description in connection with the accompanying drawings, in which

Fig. 1ª is a side elevation of the forward end of an internal combustion engine and radiator showing a modification;

Figs. 3, 4 and 5 are views of a condensing and diffusing distributor suitable for use in my present system.

Figure 1:
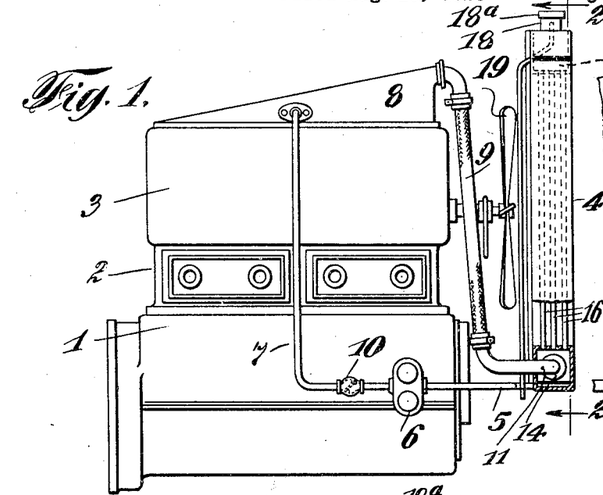
Fig. 1 is a somewhat schematic side elevation of an automobile motor and radiator equipped in accordance with my present invention, the base of the radiator being broken away in vertical section.
Figure 1A:
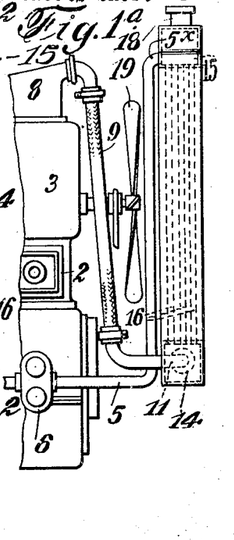

In Fig. 1, the motor is conventionally indicated as including the usual crank case 1 and cylinder block 2, the upper parts of which are enclosed by water jacket 3. The water cooling system is conventionally indicated as including the radiator 4, located as usual, on the same level with the motor and directly in front of it so that the lower part of the radiator is below the level of the water jacket of the motor. The circulation of the water from the bottom of the radiator is through a pipe 5 to pump 6, the latter being preferably driven from the engine at directly proportional speeds. The pump is indicated as being a gear pump, but this is merely to illustrate that the pump is one adapted to receive boiling water and force it into the water jacket against friction and any back pressure that may be caused by steaming. The pump discharges through a pipe 7, preferably into the top of the water jacket 3, whence the path of flow is through riser outlet 8, and downwardly extending return pipe 9. The pipe 7 may contain a check valve 10 to insure against back flow of water or steam such as might otherwise occur under operating conditions when the engine and pump are stopped. The return pipe 9 connects with a pipe 11, passing through the rear wall of the lower chamber of the radiator, although the bottom or an end wall may be used if desired. Inside the radiator, the pipe 11 has a horizontal portion 13, extending lengthwise of the lower chamber 12 and terminating in a discharge device 14.

The radiator is indicated as having the usual lower chamber 12 and upper chamber 15, serving as headers for the intermediate core, indicated in this case as comprising a great multiplicity of small tubes 16, there being in practice many more than indicated in the drawings. The upper chamber is preferably provided with an overflow pipe 17, which preferably extends into the neck 18, which is closed by a filler cap 18ᵃ. This overflow pipe is preferably freely opened to atmosphere, although it may be supplied with pressure sustaining breather valves as described in various of my prior patents and applications.

These radiators are thin from front to rear, usually 2¼ inches to 3 inches, and the core may consist of tubes which may be, say, ¼ inch to ⅜ inch diameter. The core may be, say, 21 inches by 24 inches, the usual fan, 19, being of somewhat smaller diameter and, being circular, naturally cools the middle tubes much more than the side tubes.

The discharge device is indicated as extending beneath the central best cooled tubes, but this is not essential. As shown, its length is one-half the total length of the lower chamber 12, and its primary operation while heating up is to establish upflow in one-half of the tubes. In case of excessive steaming, the bubble flow may spread endwise and change down-flow into upflow in a greater or less number of the adjacent tubes. Moreover, other things being equal, the velocity of discharge being less distributed, will be higher, and I prefer to have the discharge device much longer, as shown in certain of the other figures. In any case, it will be noted that there is a partition plate 20 above the pump supply outlet at 5, and that said plate extends well under the discharge device so that the suction of the pump takes effect on water that is kept hot by the discharge.

Figure 3:
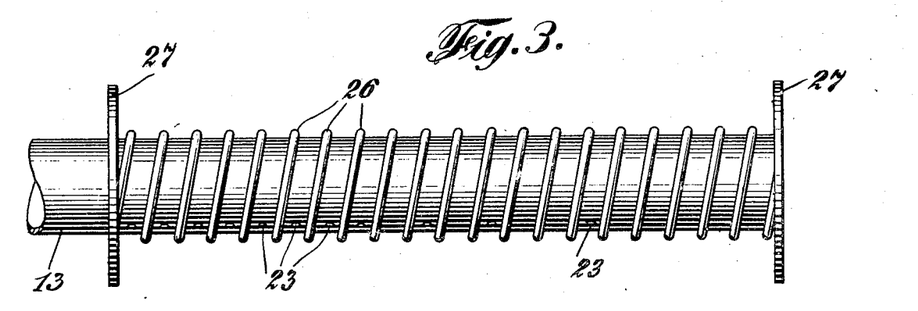
Fig. 3 being a side elevation thereof, with the wire mesh removed, Fig. 4 being a longitudinal section and Fig. 5 a transverse section of the completed device.
Figure 4:
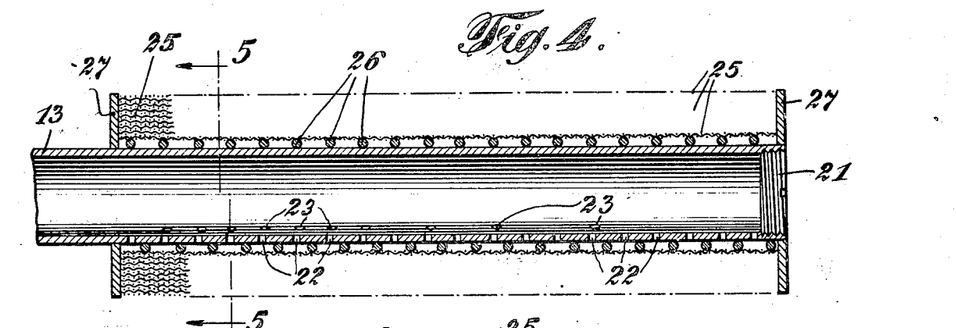
Figure 5:
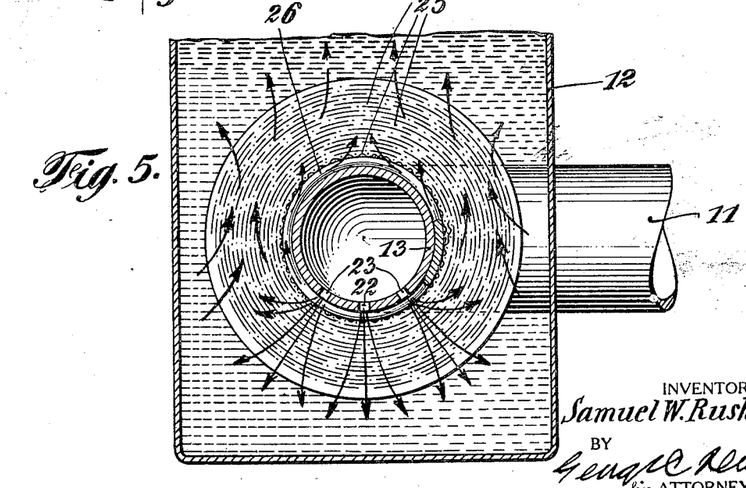

Whatever its length may be, the discharge device preferably has the construction shown in Figs. 3, 4 and 5. In these figures, the horizontally extending inlet pipe 13 is stopped up at the far end as by plug 21, whereby the endwise velocity of the steam is checked, the discharge being through radial openings as rows of drill holes 22—22, 23—23. As the endwise velocity may be very great and tend to pile up pressure at the far end of the tube, the drill holes are preferably less in number and more widely spaced or are of progressively smaller size toward said far end in order that the total discharge at the high pressure end may not be subtantially greater than at the entrance end. These outlets are preferably directed downward so that the momentum of the discharge cannot operate to blow the hot fluid directly into the cooling tubes, but will cause the initial flow to be into operative relation with the above described intake of the pump.

While the above described arrangement can be arranged to operate for fairly uniform distribution of the discharge, and while the differences in momentum between steam and water in connection with the depth pressure will tend to cause separation and up-bubbling of the steam, surrounded by the hot water, the action will be imperfect and its velocity will be high. Consequently I prefer to have this primary high velocity discharge from the jets not only downward, but impinging upon a labyrinthine flow resistance comprising a multiplicity of intercepting filaments, preferably of copper or other conducting metal. Consequently, the tube is wound for a length extending well beyond the perforations, in both directions, with many layers of woven wire, which may be ordinary wire mosquito netting. Such netting is conventionally indicated at 25 and, while there may be considerable variation in the number of layers employed and in the size of wire and in the mesh of the netting, I prefer to use thirty or more spirally wound layers.

The inner layer of the netting is preferably separated from the pipe 13 by suitable spacing means 26 which may be spirally wound wire of 1/16 inch diameter.

This gives a cylindrical annular space in which the fluid, particularly under high pressure steaming conditions, will have an opportunity to spread laterally and circumferentially over all the inner surface of the netting and making it unlikely that any outlet hole can be blocked by sediment or other impurities in the water.

I prefer to provide annular discs 27, 27, at each end of the netting, but this will not be necessary if the layers of netting are extended sufficiently beyond the outlet holes. With such a device, the separation of the steam from the hot water is effectively accomplished, a characteristic condition being where the steam escapes upward as a stream of soft bubbles surrounded by a sheath of hot water, the velocities of each being largely those due to the depth pressure and therefore relatively independent of the primary velocity of the discharge or the pressure of the steam from the engine.

Naturally, the functioning within the half inch depth of mesh cylindrically surrounding the space afforded by wire 26 is complicated and varies from time to time. When the water is cold at starting, the depth pressure has practically no effect on the water and the discharge is entirely downward, being merely diffused to a certain extent by the netting. As the water warms up, it becomes lighter and its diffusion becomes greater, the copper wires acting more or less as heat exchange medium between the downward jets of water and the adjacent cold water which tends to be drawn downward with the hot water. When the hot water begins to carry steam, the heat exchange effect is sufficient to condense all of the steam. As the steam increases, the wire mesh has a mechanical screen effect as well as heat exchange function. When steam bubbles begin to separate, being of negligible weight as compared with the water, they tend to rise actively, impelled by depth pressure but in finely subdivided condition and with a tendency to draw surrounding water upward with them in the mesh, under which condition the mesh reaches great condensing efficiency so that considerable volumes of steam can be taken care of entirely within the mesh, but the resulting condensate and heated water will flow upward into the tubes directly above the mesh, establishing thermal circulation. When the volume of steam becomes great enough to exceed the condensing capacity, the steam bubbles rise into the tubes as first above described, tending to accelerate the previously established thermal circulation of the water. Due to the previously described cut-off and bubble forming tendency of the water upon the steam, even extreme volumes of steam will be distributed to the upflow tubes without blowing through and this applies even where for any reason the supply of water to the jacket is depleted to a point where the discharge is practically all steam.

The above described complicated and shifting conditions of water discharge, steam discharge and indrawing of outside water are all graphically indicated by the arrows on Fig. 5, as to which it will be understood that the invasion and drawing in of outside water vary with the quantities of steam and the velocity of the discharge. The clearance between the side walls of the lower chamber and the periphery of the screen will also be a factor. The less space there is between the wall and the screen, the more likely outside water is to be sucked into a zone of the screen.

While the conditions and operations of the device are thus widely variable with changing conditions of the same device and are further variable with different proportions of parts, fineness of mesh, depths of mesh, etc., it is to be noted that strictly speaking the thermal circulation is not a "siphon" effect, being due to pressure from below rather than suction from above. That is to say, primarily, the heavy water in the down-flow tubes applies static pressure in the lower chamber which pushes up the warmer lighter water into and through the upflow tubes and such push will be increased by whatever momentum effect is applied by upward deflection of the discharge from the engine. Secondarily, the steam bubbles have a balloon tendency of their own which tends to carry the bubbles upward into the tubes at a rapid rate and when the bubbles are once in the tubes, they decrease the hydrostatic load that the pressure from the down tubes is overbalancing. The parts played by surface tension of the bubbles, and by the inertia, momentum and flow resistance of primary water and condensate within the upflow tubes are more or less varying and complicated, but they work out advantageously in all respects when the primary discharge is controlled in accordance with my present invention.

Figure 2:
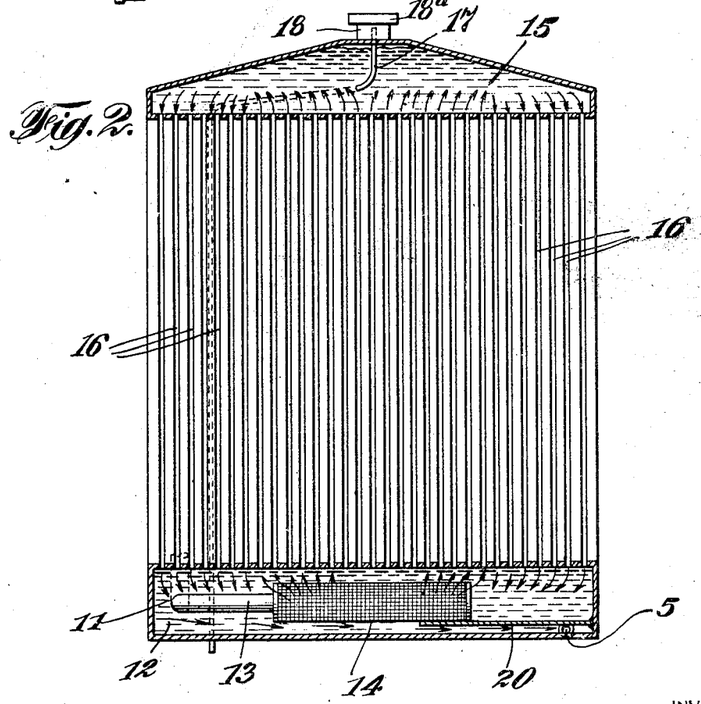
Fig. 2 is a sectional view of the radiator on the line 2—2, Fig. 1.
Figures 6, 7:
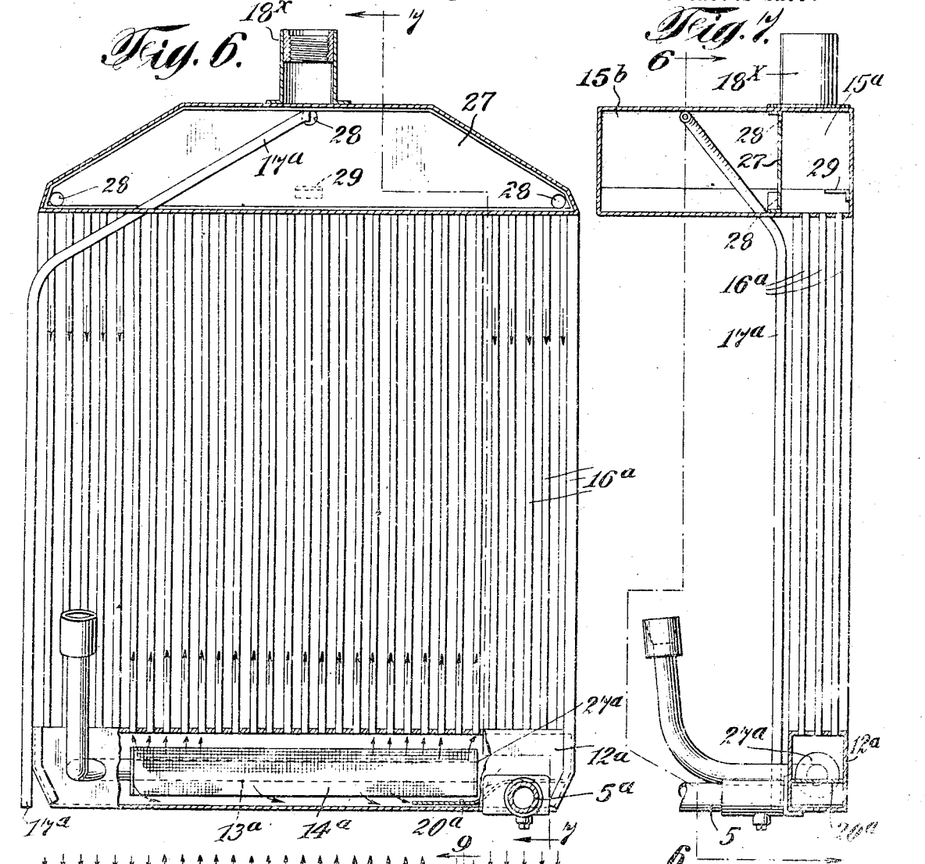
Figs. 6 and 7 are respectively face elevation and vertical section of a radiator showing another arrangement.

In Figs. 6 and 7 I have shown a modified form of radiator wherein parts similar or analogous to those of Figs. 1 and 2 are indicated by the same reference numerals, but with a different exponent. In those figures, the discharge device $14^a$ extends beneath two-thirds of the honeycomb or core tubes, so that only one-third of the tubes, one-sixth on each side, will be down-flow, the tubes between them being upflow. The upper chamber $15^a$ has its effective capacity greatly increased by a rearward extension $15^b$, from which it is separated by a splash partition 27 with restricted flow passages 28, 28, to permit equalizing of levels between the two compartments. One advantage of this is that it increases the total amount of surplus water available in the circulating system, and another is that the upper ends of the tubes 16ª may be substantially submerged even when the motor is cold, yet there will be ample reserve space in the upper chamber to hold all of the surplus water under maximum steaming conditions when substantial volumes of water are displaced by the steam. For convenience in this connection, a gauge plate 29 may be arranged within the upper chamber, in sight through the filler 18ª, indicating the height to which the system may be filled when cold, without substantial loss through the overflow pipe when running under maximum load conditions.

In this case, the overflow pipe, 17ª, preferably has its intake in the top of the supplemental chamber 15ᵇ, preferably at or near the fore and aft longitudinal and transverse centers thereof, so that ordinary slopping or momentary tilt will cause minimum loss of water therethrough.

Figure 8:
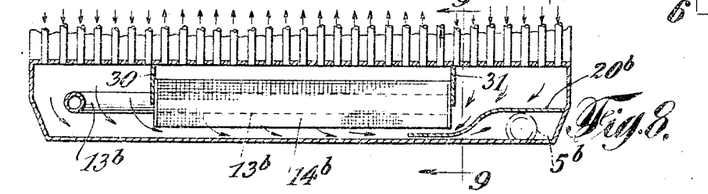
Figs. 8 and 9 are detail views of the base of a radiator showing yet other arrangements of the parts.
Figure 9:
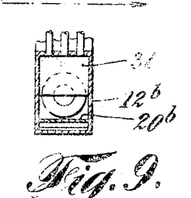

Figs. 8 and 9 illustrate how one or more transverse partitions 30, 31 can be arranged to extend downward in the lower chamber to further confine upflow from the discharge device to a given number of upflow tubes, thus more definitely establishing tubes outside of the partitions as down-flow tubes. These partitions may be located at the ends of the discharge device and utilized as brackets for anchoring the same more securely in position within the lower chamber.

Figure 10:
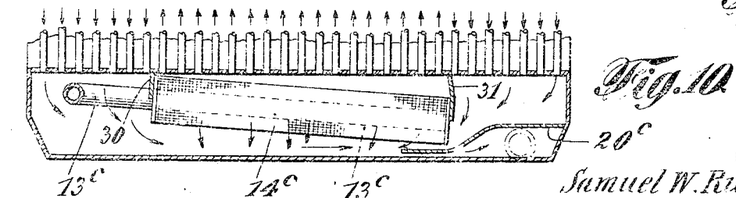
Fig. 10 is a view like Fig. 8, but showing similar parts in a slightly modified arrangement.

Fig. 10 shows the same parts, but with the discharge device 14ᶜ tilted so that the far end thereof is at a lower level and subject to greater depth pressure than the upper end. This has the effect, when steam and water are being discharged, of promoting drainage of hot water from the far end of the discharge device, nearer the intake of the pump. Another advantage is that when the engine and pump are stopped under steaming conditions, and the pressure falls to a point where colder water from the outside begins to invade the central tube 13ᶜ, such invasion will tend to progress gradually from the far end of the pipe and, working rearwardly in an orderly manner, at relatively low speed, will not mingle with the steam to cause cracking and water hammer effects such as sometimes occur as a final kick upon cessation of steam pressure.

It will of course be understood that at all other times invasion of the mesh by cold water is noiseless first, because, under most conditions, there is a protecting sheath of hot water and, second, contact of even relatively cool water within the body of the mesh will be muffled and tempered and distributed among fine bubbles in such a way that no noticeable noise can be produced.

While I have illustrated the honeycomb tubes as being all of the same size, it is obvious that variations are possible, particularly that the down-flow tubes may be much fewer in number provided they have the required downflow capacity. The space thus saved may be devoted to upflow tubes, in which case the discharge device might extend across three-fourths or more of the base of the radiator, instead of two-thirds. Also the entire radiator core may be upflow, the downflow being through one or more large outside conduits.

In making variations in the size of the tubes, however, the flow capacities and flow resistances will determine the changes in design of the several parts so as to preserve the advantages of my invention. In this connection it will be evident that while for various reasons I prefer to have all of the cooling tubes both upflow and down-flow, of the same size, so that their flow resistances and flow capacities will develop the same values under the same conditions, it is possible to modify said flow resistances and capacities by the above described changes of size and shape and also by applying special flow resistances to impede or promote flow in certain of the tubes. That is to say, while my present invention renders entirely unnecessary the use of special flow resistances in accordance with my Patent Reissue No. 16,382, it does not preclude the use of flow resistance to control the water circulation. In such case, the resistance will be of an entirely different order by reason of the fundamental differences between liquid water and gaseous steam and, in general, any such resistances should be applied to the best cooled tubes, which in the present case are upflow, rather than to the less well cooled tubes, in the patent, where all of the tubes are upflow.

Flow resistances suitable for application to the water circulation are shown in my companion application Ser. No. 128,343, filed August 10, 1926, wherein flow baffling devices are inserted in all cooling tubes of the radiator, of such a character that they afford small opposition to relatively low speed circulation of the water, but afford practically prohibitive resistance as against high speed flow of water such as can produce the above described noise effects in the tubes when considerable bodies of steam collapse therein, said devices having also an important function in decreasing the flow section and thereby promoting intermittent cut-off and bubble effect above described and minimizing sizes for the collapsible bubbles.

Similar flow resistance effects are obtainable without special forms of flow resistance devices, by employing a honeycomb of the so-called cellular type, wherein the passages have zigzag, or octagonal, or rectangular arrangement, so that high velocity flow therein is baffled by abrupt turns at short intervals. While cores having such cooling passages may be substituted for the straight tubes shown herein and used for practising the various methods herein claimed, it is a virtue of my present invention that it will operate satisfactorily with radiators of the straight cylindrical tube type. As concerns my present invention, it will be noted that the better the control by such tube resistances, the less careful one may be diffusing and minimizing the velocity of the discharge from the engine jacket.

Fig. 1ª shows how it is possible to have the pump supplied from the top chamber of the radiator. The parts may be the same as in Fig. 1 and the same reference numerals are used except that the pump intake pipe 5 has its intake 5ª in the upper chamber 15 instead of the lower chamber 12. With the radiator shown in Fig. 5, this involves no complications except that for prompt boiling, the pipe 5 would have a constriction to limit the supply. With the radiator shown in Fig. 2 the upper chamber 15 may be empty when the motor starts, because when the motor is cold the water from the radiator has to settle back to take the place of steam in the tubes, lower chamber and discharge conduits. Consequently, the cooling may begin by boiling of water trapped in the water jacket 3 and the discharge device 14 will operate as an internal steam condenser, until the volume of steam is sufficient to displace water into the upper chamber. In general, such cool intake water operates to raise the upper limit of overload, but has disadvantages and uncertainties that make it undersirable.

As to all forms of my invention, it will be understood that if the cooling capacity be exceeded, as may be the case when a fan belt breaks, the system will continue operative, with more or less loss of steam and water until the water is substantially exhausted, the final stages of the operation being in accordance with the method specifically described in my said Patent No. 1,378,724.

I claim:

1. An internal combustion engine having a water and steam cooling circuit of inadequate radiating capacity, serially including a force feed pump supplying water to the jacket of the engine, an outlet discharging hot water and steam from the jacket into the lower chamber of an air cooled radiator of the upright type having a multiplicity of small diameter cooling passages of great radiating capacity connecting a lower chamber of small radiating capacity with an upper chamber which has a high level overflow outlet, and in combination with said parts, means for maintaining a thermo-circulating body of water upflowing through some of said cooling passages and downward through others, said means including a discharge device having a multiplicity of outlets arranged to discharge warm water and then hot water and the steam from the engine in and distributed lengthwise along a region of said body of water that is below and in proximity to the lower ends of at least one-half of said passages.

2. An internal combustion engine having a water and steam cooling circuit of inadequate radiating capacity, serially including a force feed pump supplying water to the jacket of the engine, an outlet discharging hot water and steam from the jacket into the lower chamber of an air cooled radiator of the upright type having a multiplicity of small diameter cooling passages of great radiating capacity connecting a lower chamber of small radiating capacity with an upper chamber which has a high level overflow outlet, and in combination with said parts, means for maintaining a thermo-circulating body of water upflowing through some of said cooling passages and downward through others, said means including a discharge device having a multiplicity of outlets arranged to cause low velocity discharge of hot fluid from the engine in and distributed along a region of said body of water that is below and in proximity to the lower ends of a large number of said cooling passages.

3. An internal combustion engine having a water and steam cooling circuit of inadequate radiating capacity, serially including a force feed pump supplying water to the jacket of the engine, an outlet discharging hot water and steam from the jacket into the lower chamber of an air cooled radiator of the upright type having a multiplicity of small diameter cooling passages of great radiating capacity connecting a lower chamber of small radiating capacity with an upper chamber which has a high level overflow outlet, and in combination with said parts, means for maintaining a thermo-circulating body of water upflowing through some of said cooling passages and downward through others, said means including a discharge device having a multiplicity of outlets arranged to cause low velocity discharge of hot fluid from the engine in and distributed along a region of said body of water that is below and in proximity to the lower ends of a large number of said cooling passages, the intake of the pump being arranged to maintain an active cycle of boiling and condensing varying with the operations of the automotive parts, by withdrawing highly heated water from the rigion of said hot water discharge in said lower chamber.

4. An internal combustion engine having a water and steam cooling circuit of inadequate radiating capacity, serially including a force feed pump supplying water to the jacket of the engine, an outlet discharging hot water and steam from the jacket into the lower chamber of an air cooled radiator of the upright type having a multiplicity of small diameter cooling passages of great radiating capacity connecting a lower chamber of small radiating capacity with an upper chamber which has a high level overflow outlet, and in combination with said parts, means for maintaining a thermo-circulating body of water upflowing through some of said cooling passages and downward through others, said means including a discharge device having a multiplicity of outlets arranged to cause low velocity discharge of hot fluid from the engine downward in and distributed lengthwise along a region of said body of water that is below and in proximity to the lower ends of said upflow passages.

5. An internal combustion engine having a water and steam cooling circuit of inadequate radiating capacity, serially including a force feed pump supplying water to the jacket of the engine, an outlet discharging hot water and steam from the jacket into the lower chamber of an air cooled radiator of the upright type having a multiplicity of small diameter cooling passages of great radiating capacity connecting a lower chamber of small radiating capacity with an upper chamber which has a high level overflow outlet, and in combination with said parts, means for maintaining a thermo-circulating body of water upflowing through some of said cooling passages and downward through others, said means including a discharge device having a multiplicity of outlets arranged to cause low velocity discharge of hot fluid from the engine downward in and distributed lengthwise along a region of said body of water that is below and in proximity to the lower ends of said upflow passages, said intake of the pump being arranged to draw water from the region of said downward discharge within the radiator.

6. An internal combustion engine having a water and steam cooling circuit of inadequate radiating capacity, serially including a force feed pump supplying water to the jacket of the engine, an outlet discharging hot water and steam from the jacket into the lower chamber of an air cooled radiator of the upright type having a multiplicity of small diameter cooling passages of great radiating capacity connecting a lower chamber of small radiating capacity with an upper chamber which has a high level overflow outlet, and in combination with said parts, means for maintaining a thermo-circulating body of water upflowing through some of said cooling passages and downward through others, said means including a discharge device having a multiplicity of outlets arranged to cause discharge of hot water from the engine in and distributed along a region of said body of water that is below and in proximity to the lower ends of more than one-half of said passages and at velocities and in directions permitting direct upflow into said intakes of the upflow passages whereby when steam is discharged, its flow will partake of the thus established thermal circulation of the water.

7. An internal combustion engine having a water and steam cooling circuit of inadequate radiating capacity, serially including a force feed pump supplying water to the jacket of the engine, an outlet discharging hot water and steam from the jacket into the lower chamber of an air cooled radiator of the upright type having a multiplicity of small diameter cooling passages of great radiating capacity connecting a lower chamber of small radiating capacity with an upper chamber which has a high level overflow outlet, and in combination with said parts, means for maintaining a thermo-circulating body of water upflowing through some of said cooling passages and downward through others, said means including a conduit arranged lengthwise in said lower chamber and adapted to check the lengthwise velocity of the primary flow from the engine and direct the discharge through a multiplicity of longitudinally distributed outwardly directed jets into and through a deep layer of reticulated, flow resistance material.

8. An engine cooling system serially including a force feed pump supplying water to the jacket of the engine, with an outlet discharging hot water and steam from the jacket and with an intake for the pump, both in the lower chamber of an air cooled radiator of the upright type having a multiplicity of small diameter cooling passages of great radiating capacity connected at the bottom through a lower chamber of small radiating capacity and cross-connected at the top and, in combination with said parts, means for maintaining a thermo-circulating body of water flowing upward in some of said cooling passages and downward in others, said means including a discharge conduit extending lengthwise in said lower chamber having a multiplicity of lateral outlets distributed below a desired large number of the upflow passages and directing discharge of the hot fluids crosswise, substantially without component endwise of said lower chamber.

9. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets.

10. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets diminishing in flow capacity toward the far end thereof.

11. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets diminishing in flow capacity toward the far end thereof, and an outer flow resistance medium through which said discharge is directed.

12. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets diminishing in flow capacity toward the far end thereof, an outer flow resistance medium through which said discharge is directed and spacing means interposed between said flow resistance medium and said outlets to distribute the flow from the latter and to permit lateral escape of the steam from the water.

13. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets, an outer flow resistance medium through which said discharge is directed and spacing means interposed between said flow resistance medium and said outlets to distribute the flow from the latter and to permit lateral escape of the steam from the water.

14. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets diminishing in flow capacity toward the far end thereof, and an outer flow resistance medium through which said discharge is directed comprising a multiplicity of layers of wire gauze and spacing means interposed between said flow resistance medium and said outlets to distribute the flow from the latter and to permit lateral escape of the steam from the water.

15. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets directed downwardly.

16. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets downwardly directed and diminishing in flow capacity toward the far end thereof.

17. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets downwardly directed and diminishing in flow capacity and an outer flow resistance medium through which said discharge is directed.

18. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets downward directed and diminising in flow capacity, an outer flow resistance medium through which said discharge is directed and spacing means interposed between said flow resistance medium and said outlets to distribute the flow from the latter and to permit lateral escape of the steam from the water.

19. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of lateral outlets downwardly directed, an outer flow resistance medium through which said discharge is directed and spacing means interposed between said flow resistance medium and said outlets to distribute the flow from the latter and to permit lateral escape of the steam from the water.

20. An engine cooling system serially including a force feed pump supplying water to the jacket of the engine, with an outlet discharging hot water and steam from the jacket and with an intake for the pump, both in the lower chamber of an air cooled radiator of the upright type having a multiplicity of small diameter cooling passages of great radiating capacity connected at the bottom through a lower chamber of small radiating capacity and cross-connected at the top and, in combination with said parts, means for maintaining a thermo-circulating body of water flowing upward in some of said cooling passages and downward in others, said means including a discharge conduit extending lengthwise in said lower chamber having a multiplicity of downward outlets distributed below a desired large number of the upflow passages and surrounded by flow resistance material of diameter approximating that of the space between the front and rear walls of said lower chamber thereof constricting the space available for free upflow of water to said upflow passages.

21. In a system for cooling variable duty engines by heating water to absorb heat of the engine under certain conditions and by also boiling it to produce large volumes of steam under other conditions, means for cooling the water and condensing the steam, including an air cooled, water-filled radiator of the upright type having passages of great radiating capacity connected at the bottom through a lower chamber of small radiating capacity and at the top by an upper chamber whereby said passages are submerged, in combination with a discharge device for the water and steam in said lower chamber including a conduit extending lengthwise thereof and formed with a multiplicity of downwardly directed outlets, diminishing in flow capacity toward the far end thereof, an outer flow resistance medium through which said discharge is directed, together with a pump drawing hot water from the region of said downward discharge and force feeding it to the engine.

22. In a system for cooling variable duty engines by heating and boiling water to absorb heat of the engine, a circulating system for cooling the water and condensing the steam, including an air cooled, water-filled radiator of the upright type having passages of great radiating capacity connected at the bottom through a lower chamber of small radiating capacity in which said water and steam are discharged and, at the top, connected by an upper chamber whereby said passages are submerged, in combination with a distributed resistance means in said lower chamber arranged to lower the velocity and distribute the flow of water and steam into the submerged lower ends of said passages.

23. A water cooled engine, a water filled radiator and a circuit including a conduit from the upper part of the water jacket discharging into the base of the radiator and a pump withdrawing water from the base of the radiator and supplying it to the jacket in quantities insufficient for water cooling, whereby the radiator operates as an upflow water cooler and steam condenser, and in combination with said parts a diffusing resistance means in the path of upflow of water and of steam in the radiator.

24. A water cooled engine, a water filled radiator and a circuit including a conduit from the upper part of the water jacket discharging into the base of the radiator and a pump withdrawing water from the base of the radiator and supplying it to the jacket in quantities insufficient for water cooling, whereby the radiator operates as an upflow water cooler and steam condenser, and in combination with said parts resistance means for distributing the discharge and checking the velocity of its flow into the cooling tubes of the radiator.

Signed at Plainfield, in the county of Union and State of New Jersey, this 9th day of August, A. D. 1926.

SAMUEL W. RUSHMORE.